United States Patent [19]  [11] 3,984,325
Rosaen  [45] Oct. 5, 1976

[54] FILTER DEVICE

[76] Inventor: Nils O. Rosaen, 3774 Quarton Rd., Bloomfield Hills, Mich. 48013

[22] Filed: Jan. 6, 1975

[21] Appl. No.: 538,525

[52] U.S. Cl. .............................................. 210/236
[51] Int. Cl.² ........................................ B01D 27/08
[58] Field of Search ........... 210/232, 322, 323, 340, 210/335, 329, 350, 352, 447, 435, 236

[56] References Cited
UNITED STATES PATENTS

| 913,768 | 3/1909 | Roberts | 210/329 |
|---|---|---|---|
| 2,265,550 | 12/1941 | Smith | 210/335 |
| 3,062,377 | 11/1962 | Howard et al. | 210/338 X |
| 3,132,501 | 5/1964 | Jacobs et al. | 210/335 |
| 3,286,838 | 11/1966 | Jones | 210/232 |
| 3,390,778 | 7/1968 | Uhen | 210/335 X |
| 3,645,401 | 2/1972 | Roberts | 210/232 |
| 3,815,746 | 6/1974 | Ward | 210/340 |
| 3,870,636 | 3/1975 | Schettler | 210/335 |

Primary Examiner—Theodore A. Granger
Attorney, Agent, or Firm—Gifford, Chandler & Sheridan

[57] ABSTRACT

A filter device comprising a cylindrical tubular housing with a plurality of cartridge filters slidably disposed within a central bore of the housing. Each cartridge filter includes a tubular filter element disposed between a front end cap and a back end cap of the cartridge filter. A fluid inlet formed through the housing of the filter assembly communicates with the outer periphery of the filter element while the internal surface of the filter element communicates with an outlet formed in the housing via a bore formed through the front end cap of the next adjacent cartridge filter. Both the front end cap and the back end cap form a sealing engagement with the central bore of the housing so that as the filter element becomes dirty or clogged, a clean cartridge filter may be axially positioned in the housing to filter the fluid flow between the inlet and outlet without disrupting the fluid flow rate through the filter assembly. The dirty cartridge filter, which is no longer in fluid communication with either the inlet or outlet in the housing, likewise may be removed and cleaned or discarded without interrupting the fluid flow through the filter assembly.

10 Claims, 6 Drawing Figures

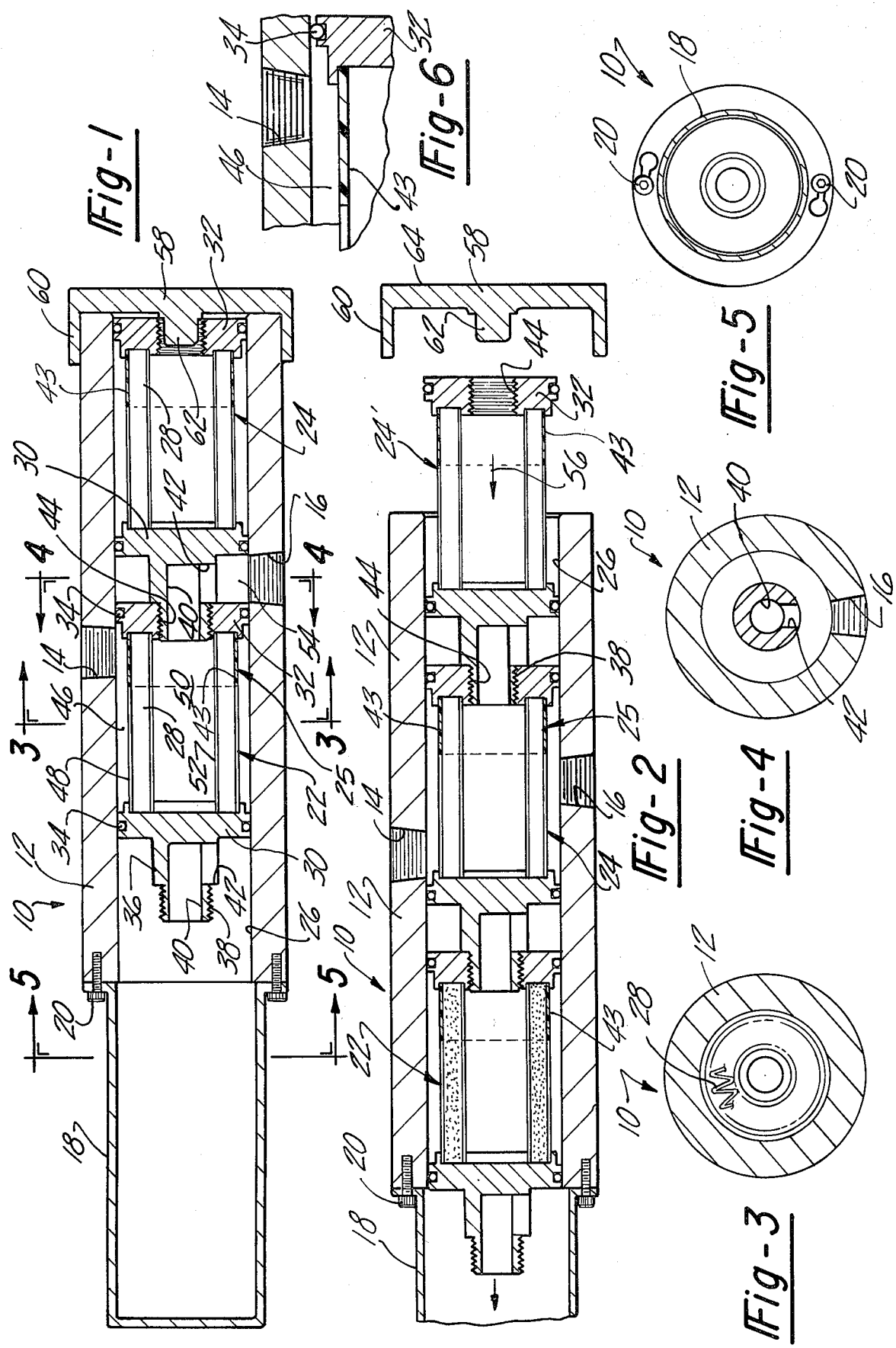

FILTER DEVICE

BACKGROUND OF THE INVENTION

1. Field of the Invention

The present invention relates generally to filter devices, and more particularly to a filter device in which the filter element may be changed without interrupting the fluid flow through the device.

2. Description of the Prior Art

There are many types of previously known filter devices. In all filter devices the filter element eventually becomes clogged or dirty and thus requires periodic cleaning or replacement. When replacement of the filter element is required, in one class of previously known filter devices, it has been necessary to stop the fluid flow through the filter device in order to replace the filter element. This type of filter device is disadvantageous in that the fluid system serviced by the filter device must be stopped while the filter element is being replaced.

In a similar class of filter devices, a second, or backup, filter element is provided so that the fluid flow may be diverted through the back up filter element while the other or primary, filter element is being replaced and vice versa. Although with this type of previously known filter devices it is not necessary to stop the fluid flow through the filter device, such filter devices are unduly complex and thus expensive to manufacture.

In still another type of previously known filter devices, a clogged or dirty filter element is removed from the fluid flow and replaced by a clean filter element. The dirty filter element is then automatically cleaned by the filter device and is thus ready to be replaced in the fluid flow when desired. Like the last described class of previously known filter devices, this type of filter device is also complex and expensive to manufacture.

SUMMARY OF THE INVENTION

The present invention obviates the above disadvantages of the previously known filter devices by providing a cartridge filter assembly of simple and inexpensive construction wherein dirty or clogged filter elements may be replaced by clean filter elements without interrupting the fluid flow through the filter device. The cartridge filter assembly of the present invention includes a cylindrical housing having a central bore therethrough. Two transverse bores through the housing communicate with the central bore and form the fluid inlet and outlet for the filter assembly of the present invention. At least two cartridge filters are slidably disposed within the central bore of the housing so that the axial position of the cartridge filter relative to the housing determines which of the cartridge filters fluidly communicates with the housing inlet and outlet bores and, hence, which cartridge filter performs the filtering operation.

Each cartridge filter comprises a cylindrical tubular filter element disposed between a front and back end cap which end caps sealingly engage the internal surface of the center bore of the housing. The front end cap includes a forwardly projecting coaxial extension which threadably engages an axial through bore in the back end cap. The extension of the front end cap includes a central bore which communicates with the fluid outlet in the housing and with the internal surface of the filter element. The fluid inlet communicates with the outer periphery of the filter element so that fluid flows from the fluid inlet, through the filter element, through the central bore of the front end cap extension of the adjacent cartridge filter, and out through the fluid outlet in the housing.

When the filter element becomes clogged or dirty, the front end cap extension of the clean cartridge filter is screwed into the back end cap of the most rearward cartridge filter. The cartridge filter is then manually inserted into the housing causing the cartridge filters to slide axially along the central bore of the housing. When the new cartridge filter is completely inserted into the central bore of the housing as described, a clean cartridge filter is properly positioned in the fluid path between the housing inlet and outlet thereby continuing the filtering operation with a clean filter element and without interruption of the fluid flow. The cartridge filter with the dirty filter element is no longer in fluid communication with either the inlet or outlet of the housing and thus may be removed and cleaned or discarded.

BRIEF DESCRIPTION OF THE DRAWINGS

The present invention will be more clearly understood by reference to the following detailed description wherein like reference characters refer to like parts throughout the several views and in which:

FIG. 1 is a cross sectional view showing the filter device of the present invention;

FIG. 2 is a side cross sectional view of the filter device of the present invention showing the position of the cartridge filter assembly during the filter changing operation;

FIG. 3 is a cross sectional view taken substantially along line 3—3 in FIG. 1;

FIG. 4 is a cross sectional view taken substantially along line 4—4 in FIG. 1;

FIG. 5 is a cross sectional view taken substantially along line 5—5 of FIG. 1; and FIG. 6 is a fragmentally enlarged sectional view of a portion of the structure shown in FIG. 1.

DETAILED DESCRIPTION OF THE PREFERRED EMBODIMENT

The filter device of the present invention, generally indicated by the numeral 10, has a cylindrical housing 12 with a central axial bore 26 therethrough which housing 12 is preferably constructed of metal.

As illustrated and as will become more apparent as the description proceeds, the housing 12 can just be a piece of conventional tubing cut to the appropriate length. This substantially reduces manufacturing costs.

The housing 12 includes a transverse fluid inlet 14 and a transverse fluid outlet 16 which is located somewhat rightwardly of the inlet 14 as viewed in FIGS. 1 and 2. The fluid inlet 14 and outlet 16 are preferably threaded to receive conventional fluid fittings (not shown). It should be apparent as the description proceeds that the opening 14 could instead be the outlet and in such an arrangement the opening 16 would be the inlet. A closed cylindrical cap 18 is also preferably secured to the left side of the housing 12 by fastening members 20. A cap 58 snaps over the opposite end of the housing 12 to close the bore 26.

A cartridge filter 22 and an adjacent cartridge filter 24 are coaxially disposed within the central bore 26 of the housing 12. The cartridge filter 22 is substantially identical to the cartridge filter 24, and different reference characters are used for the cartridge filters 22 and 24 for ease of description only. However, it should be remembered that the general description of the construction of the cartridge filter 22 also applies to the cartridge filter 24.

The cartridge filter 22 generally comprises a cylindrical filter element 28 disposed between a front end cap 30 and a rear end cap 32. The filter element 28 is preferably of pleated construction, as shown in FIG. 3, and is secured to the end caps 30 and 32 by any conventional means, such as glue. The front end cap 30 is generally circular in shape and includes sealing means 34, such as an O-ring, to sealingly engage the central bore 26 of the housing 12. An integral coaxial extension 36 projects leftwardly, as viewed in FIGS. 1 and 2, from the front end cap 30 and has a threaded portion 38. A coaxial bore 40 is provided through the extension 36 and a transverse bore 42 intersects the bores 40 at the base of the extension as best shown in FIG. 4.

The back end cap 32, like the front end cap 30, is circular in cross section and includes sealing means 34 to provide a sealing engagement with the central bore 26 of the housing 12. However, unlike the front end cap 30, the back end cap 32 has a central axial bore 44 therethrough which is threaded and adapted to threadably receive the threaded portion 38 on the front end cap extension 36 of the adjacent cartridge filter 24. As can best be seen in FIG. 6 a cylindrical baffle 43 extends inwardly from the back end cap 32 to protect a portion of the filter element 28 from direct fluid impingement from the inlet 14 and to aid in the circulation of the fluid along the entire length of the filter element 28.

The cartridges 22 and 24 when fastened together by the mating threaded portion 38 and the bore 44 form a cartridge assembly 25 as best seen in FIG. 1.

Still referring to FIG. 1, the cartridge filter assembly 25 is shown in a position for a filtering operation. As shown in FIG. 1 the filter element 28 is preferably of a smaller diameter than the internal bore 26 of the housing 12 thereby defining an annular chamber 46 between the housing 12 and the outer periphery 48 of the filter element 28 which chamber 46 communicates with the fluid inlet 14. The internal surface 42 of the filter element 28 also defines a generally cylindrical internal chamber 40. The chamber 54 communicates with the housing fluid outlet 16 through the bores 40 and 42 of the front end cap 30 of the adjacent cartridge filter 24. It should also be noted that an annular chamber 54 is formed between the back end cap 32 of the cartridge filter 22 and the front end cap 30 of the rear adjacent cartridge filter 24 in the housing 12 so that fluid communication is maintained between the transverse bore 42 and the fluid outlet 16 regardless of the rotational position of the bore 42 relative to the outlet 16.

The operation of the present invention may now be described. The cartridge filter assembly 25 is shown in FIG. 1 during a standard filtering operation. Fluid enters from the fluid inlet 14 into the annular chamber 46, through the filter element 28 and into the cylindrical chamber 50 defined by the filter element 28. From the chamber 50, fluid flows through the bore 40 in the front end cap 30 of the adjacent cartridge filter 24, through the transverse bore 42 into the annular chamber 54 and out through the fluid outlet 16. During the filtering operation the sealing means 34 on the front end cap 30 of the cartridge filter 22 prevents fluid communication between the annular chamber 46 and the retaining cap 18. Similarly, the sealing means 34 on the front end cap 30 of the adjacent cartridge filter 24 prevents fluid communication between the annular chamber 54 and the filter element 28 of adjacent cartridge filter 24.

As the cartridge filter 22 continues to remove impurities from the fluid flow, the filter element 28 of the cartridge filter 22 becomes clogged and dirty and requires replacement. As best shown in FIG. 2, to effectuate the replacement of the dirty cartridge filter 22, the cap 58 is removed and a clean cartridge filter 24' is inserted into the central bore 26 of the housing 12 so that the front end cap 30 of the cartridge filter 24' is adjacent the back end cap 32 of the cartridge filter 24. The new cartridge filter 24' is then rotated so as to screw the threaded portion 38 of the cartridge filter 24' into the receiving threaded aperture 44 of the adjacent cartridge filter 24 to the configuration shown in FIG. 2. When the new cartridge filter 24' is properly screwed into the adjacent cartridge filter 24, the new cartridge filter 24' is forced in the direction indicated by arrow 56 into the central bore 26 of the housing 12.

When the new cartridge filter 24' is entirely inserted into the central bore 26 the adjacent cartridge filter 24 will then be properly positioned between the fluid inlet 14 and the fluid outlet 16 to continue the filtering operation as has heretofore been described. Simultaneously the dirty cartridge filter 22 will be expelled from the central housing bore 26 into the retaining cap 18. The dirty cartridge filter 22 may then be removed from the cartridge filter assembly and either cleaned or discarded by removing the retaining cap 18 and unscrewing the cartridge filter 22 from the adjacent cartridge filter 24. It should also be apparent from the above description that the new cartridge filter 24' will simultaneously assume the position of the cartridge filter 24 as shown in FIG. 1.

As can best be seen in FIG. 5, the cap 18 can be rotated to a position bringing enlarged portions 70 of slots 72 into alignment with the heads of the fastening members 20 to permit axial removal of the cap 18.

Although the above described replacement of the cartridge filter may be performed by automatic machines or the like, in the preferred form of the invention the cartridge filter replacement is performed manually. Thus to facilitate the swift and easy replacement of the cartridge filter and to properly position a clean cartridge filter in the path of the fluid flow the cap 58 preferably includes a radial flange 60 adapted to snugly fit around the outer periphery of the housing 12 and a central stub member 62 which is adapted to snugly fit within the threaded bore 44 of the back end cap 32. The cap 58 thus provides a large flat surface 64 to aid an operator in pushing the cartridge filters into the housing 12 but also the limited travel of the pusher cap 58 as the cap 58 abuts against the housing 12 will prevent over-insertion of the cartridge into the housing 12. The stub member 62 and the flange 60 provide guides for proper axial movement of the cartridge filters.

It is apparent that the seals 34 eliminate the need for sealing engagements between either the cap 48 and the housing 12 or the cap 58 and the housing 12. This substantially reduces costs and eliminates a problem inherent in most prior art filter devices.

It is also apparent that the filter device of the present invention, unlike previously known filter devices with interchangeable filter assemblies, is of very simple and inexpensive construction and yet is efficient in operation and easy in use. It should also be apparent from the foregoing description that the cartridge filter assembly of the present invention permits a clean filter to be interchanged for a dirty or clogged filter without interrupting the fluid flow through the filter device.

Having thus described my invention many modifications thereto will become apparent to those skilled in the art to which it pertains without deviating from the spirit of the invention as defined by the scope of the appended claims.

What is claimed is:

1. A filter device comprising:
   a housing defining an open ended filter chamber therein and an inlet and an outlet formed in said housing and opening laterally into said filter chamber intermediate the ends thereof,
   a first filter element disposed within said filter chamber and being axially movable through the open ends thereof;
   seal means at each end of said first filter element to prevent fluid leakage between said housing and said first filter element;
   said first filter element having inlet means communicating with the inlet formed in said housing and outlet means communicating with the outlet formed in said housing whereby fluid flowing into said housing through said inlet passes through said first filter element to be filtered before being discharged from said filter device through said outlet;
   a second filter element substantially identical to said first filter element and means providing engagement between said filter elements to permit said second filter element to be moved axially through one open end of said housing to move said first filter element axially out of the path of fluid from said inlet to said outlet and to thereby permit said second filter element to assume the position formerly occupied by said filter element.

2. The filter device as defined in claim 1 and including a cap removably mounted at one end of said housing for receiving said first filter element upon axial movement of said second filter element into fluid filtering position.

3. A filter device comprising:
   a tubular housing having a central bore therethrough, a first transverse bore forming a fluid inlet and a second transverse bore forming a fluid outlet, said transverse bores being formed in said tubular housing intermediate the open ends thereof,
   a first and a second cartridge filter slidably disposed within said central bore of said housing,
   each of said cartridge filters further comprising a front end cap and a back end cap, a filter element disposed between said front end cap and said back end cap,
   the front end cap of said second cartridge filter and the back end cap of said first cartridge filter cooperating to form an inlet means communicating said fluid inlet with the inlet side of said first cartridge filter,
   seal means isolating said filter element of said first cartridge filter from said open ends of said tubular housing,
   said second filter cartridge being movably axially within said tubular housing to move said first cartridge filter out of communication with said inlet and said outlet and to move said filter element of said second cartridge filter into registry therewith.

4. The filter device as defined in claim 3 wherein the back end cap of said first cartridge filter includes a central bore therethrough, a passage formed through said extension and communicating with said inlet when said first cartridge filter is disposed intermediate said inlet and said outlet.

5. The filter device as defined in claim 4 wherein said extension has a smaller diameter than the central bore of the housing and said fluid passageway in said extension comprises an axial bore and an intersecting transverse bore at the base of the extension.

6. The filter device as defined in claim 4 wherein the bore through the back end cap is threaded and adapted to threadably receive a threaded portion on said extension.

7. The filter device as defined in claim 3 and in which said seal means are disposed on said front and back end caps of said cartridge filters.

8. The filter device as defined in claim 3 and in which said tubular housing is sufficiently long to receive said first cartridge filter when said second cartridge filter has been moved axially into filtering position and has therefore moved said first cartridge filter out of filtering position.

9. The filter device as defined in claim 3 and in which said tubular housing is sufficiently long to house said second cartridge filter when said first cartridge filter is in a filtering position.

10. The filter device as defined in claim 3 and including a cap removably mounted to one end of said tubular housing to receive said first cartridge filter when said second cartridge filter has been moved axially into filtering position and has therefore moved said first cartridge filter out of filtering position.

* * * * *